US010699709B2

(12) United States Patent
Bostick et al.

(10) Patent No.: US 10,699,709 B2
(45) Date of Patent: Jun. 30, 2020

(54) CONFERENCE CALL ANALYSIS AND AUTOMATED INFORMATION EXCHANGE

(71) Applicant: INTERNATIONAL BUSINESS MACHINES CORPORATION, Armonk, NY (US)

(72) Inventors: James E. Bostick, Cedar Park, TX (US); John M. Ganci, Jr., Cary, NC (US); Martin G. Keen, Cary, NC (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 116 days.

(21) Appl. No.: 16/003,601

(22) Filed: Jun. 8, 2018

(65) Prior Publication Data

US 2019/0378502 A1  Dec. 12, 2019

(51) Int. Cl.
| | | |
|---|---|---|
| *G10L 15/22* | (2006.01) | |
| *G10L 15/18* | (2013.01) | |
| *G10L 17/00* | (2013.01) | |
| *H04M 3/56* | (2006.01) | |
| *G06F 16/33* | (2019.01) | |

(52) U.S. Cl.
CPC .......... *G10L 15/22* (2013.01); *G10L 15/1815* (2013.01); *G10L 17/005* (2013.01); *G06F 16/334* (2019.01); *G10L 2015/223* (2013.01); *H04M 3/56* (2013.01)

(58) Field of Classification Search
CPC ......... H04M 3/56; H04L 12/1813; H04N 7/15
See application file for complete search history.

(56) References Cited

U.S. PATENT DOCUMENTS

| | | | | |
|---|---|---|---|---|
| 6,343,313 | B1 * | 1/2002 | Salesky ................ | G06F 3/1415 709/204 |
| 6,728,356 | B1 * | 4/2004 | Carroll .................... | H04M 3/56 379/201.01 |
| 7,130,404 | B2 | 10/2006 | Coles et al. | |
| 7,466,334 | B1 | 12/2008 | Baba | |
| 7,617,094 | B2 | 11/2009 | Aoki et al. | |
| 8,456,507 | B1 | 6/2013 | Mallappa et al. | |
| 9,154,631 | B2 | 10/2015 | Goguen et al. | |
| 9,560,316 | B1 * | 1/2017 | Lindberg ................ | H04N 7/15 |
| 10,360,894 | B1 * | 7/2019 | Rakshit .................. | G06F 3/013 |
| 2005/0081160 | A1 * | 4/2005 | Wee ........................ | G06Q 10/10 715/755 |

(Continued)

FOREIGN PATENT DOCUMENTS

EP    2395699 A1    12/2011

OTHER PUBLICATIONS

Peter Mell et al, The NIST Definition of Cloud Computing, National Institute of Standards and Technology, Publication 800-145, 2011, entire document.

(Continued)

*Primary Examiner* — Douglas Godbold
(74) *Attorney, Agent, or Firm* — Patrick J. Daugherty; Daugherty & Del Zoppo Co., LPA

(57) ABSTRACT

Aspects analyze conference call audio wherein processors are configured to determine a main conversation of a conference call, distinguish a side conversation within the conference call from the main conversation, determine a question asked within the main conversation, and identify an occurrence of an answer to the question within the side conversation.

18 Claims, 4 Drawing Sheets

(56) References Cited

U.S. PATENT DOCUMENTS

| | | | |
|---|---|---|---|
| 2005/0276405 A1* | 12/2005 | Fernandes | H04M 3/56 379/202.01 |
| 2006/0092269 A1* | 5/2006 | Baird | H04L 12/1822 348/14.08 |
| 2008/0165708 A1 | 7/2008 | Moore et al. | |
| 2008/0167878 A1* | 7/2008 | Hause | G10L 15/22 704/270 |
| 2013/0300648 A1* | 11/2013 | Kim | G06F 3/011 345/156 |
| 2018/0005632 A1* | 1/2018 | Mann | H04R 1/32 |
| 2018/0285059 A1* | 10/2018 | Zurek | G06F 3/165 |

OTHER PUBLICATIONS

Mansoor Hyder et al, Placing the Participants of a Spatial Audio Conference Call, IEEE CCNC 2010 proceedings, entire document, 2010.

* cited by examiner

CONFERENCE CALL ANALYSIS AND AUTOMATED INFORMATION EXCHANGE

BACKGROUND

Conference calls are used to communicate with a number of people at a number of different locations. For a conference call within an organization, a leader sets, and may pre-distribute, an agenda for the call. The agenda may include a wide range of topics for discussion like target goals, deadlines, and new hires.

SUMMARY

In one aspect of the present invention, a computerized method for analyzing conference call audio includes executing steps on a computer processor. Thus, a computer processor is configured to determine a main conversation of a conference call, distinguish a side conversation within the conference call from the main conversation, determine a question asked within the main conversation, and identify an occurrence of an answer to the question within the side conversation.

In another aspect, a system has a hardware processor in circuit communication with a computer readable memory and a computer-readable storage medium having program instructions stored thereon. The processor executes the program instructions stored on the computer-readable storage medium via the computer readable memory and is thereby configured to determine a main conversation of a conference call, distinguish a side conversation within the conference call from the main conversation, determine a question asked within the main conversation, and identify an occurrence of an answer to the question within the side conversation.

In another aspect, a computer program product for analyzing conference call audio includes executing steps on a computer processor that has a computer-readable storage medium with computer readable program code embodied therewith. The computer readable hardware medium is not a transitory signal per se. The computer readable program code includes instructions for execution which cause the processor to determine a main conversation of a conference call, distinguish a side conversation within the conference call from the main conversation, determine a question asked within the main conversation, and identify an occurrence of an answer to the question within the side conversation.

BRIEF DESCRIPTION OF THE DRAWINGS

These and other features of embodiments of the present invention will be more readily understood from the following detailed description of the various aspects of the invention taken in conjunction with the accompanying drawings in which.

DETAILED DESCRIPTION

Figure 1:
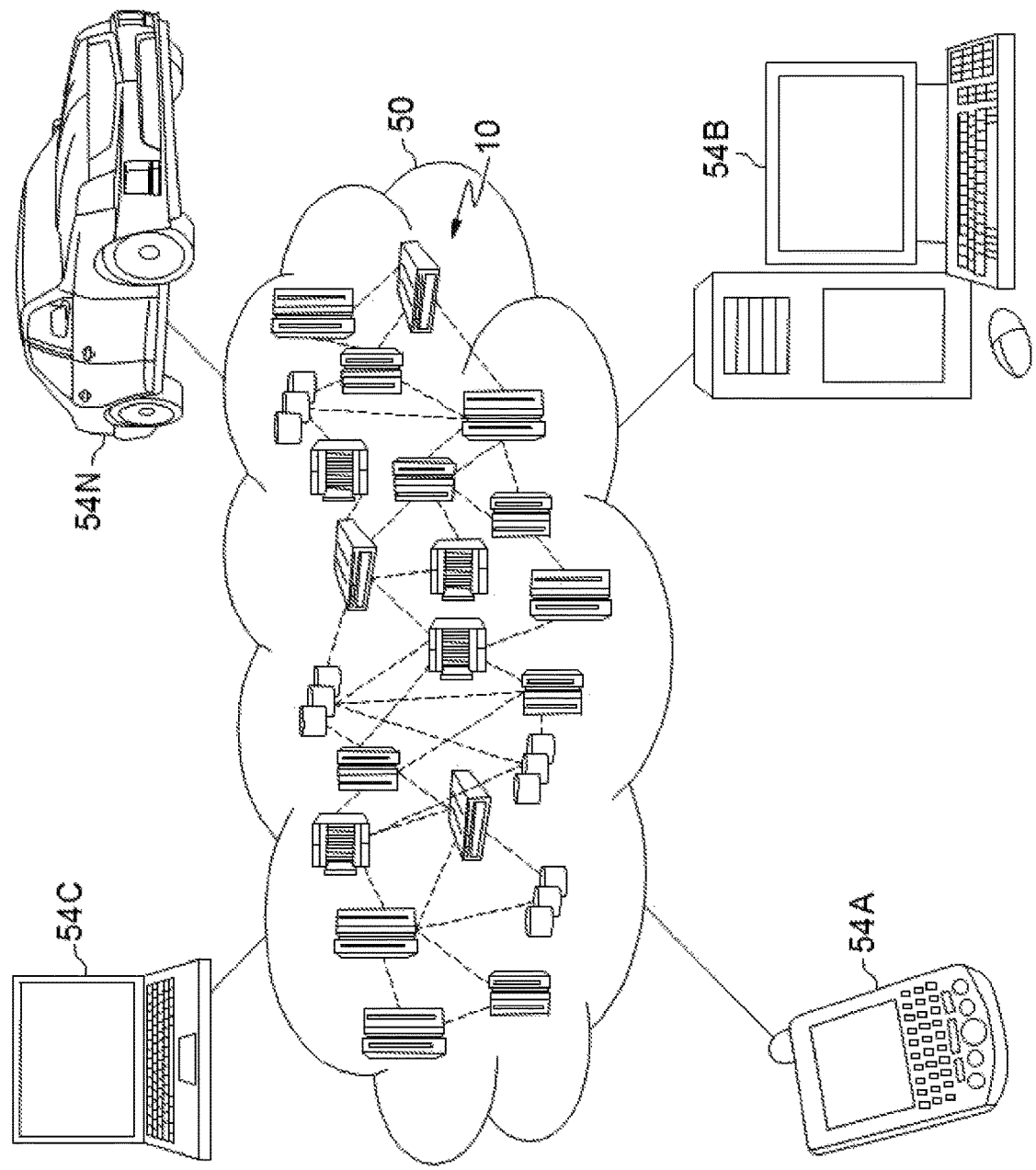
FIG. 1 depicts a cloud computing environment according to an embodiment of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, mechanically encoded devices such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems; storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
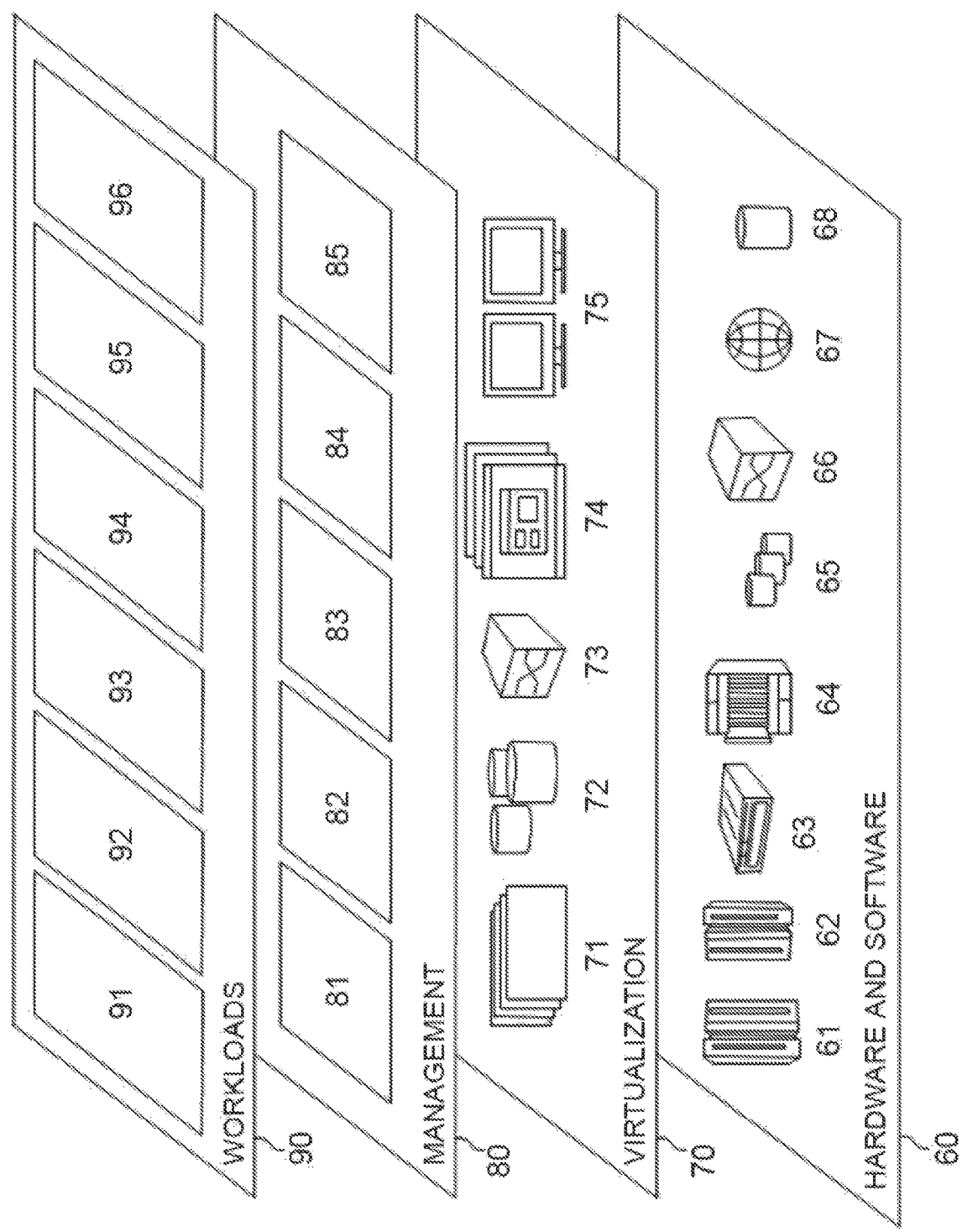
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing for analyzing conference call audio 96.

Figure 3:
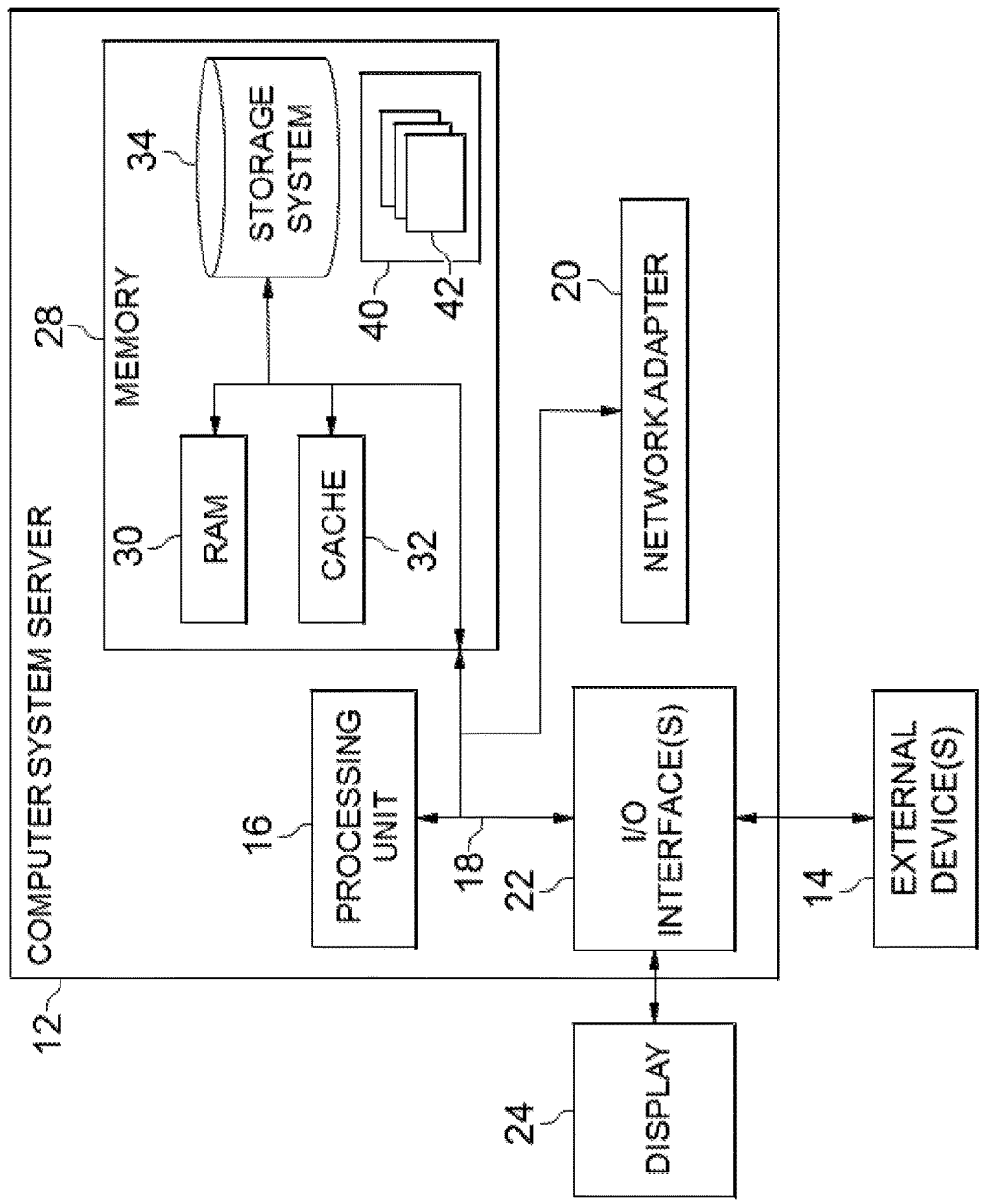
FIG. 3 depicts a computerized aspect according to an embodiment of the present invention.

FIG. 3 is a schematic of an example of a programmable device implementation 10 according to an aspect of the present invention, which may function as a cloud computing node within the cloud computing environment of FIG. 2. Programmable device implementation 10 is only one example of a suitable implementation and is not intended to suggest any limitation as to the scope of use or functionality of embodiments of the invention described herein. Regardless, programmable device implementation 10 is capable of being implemented and/or performing any of the functionality set forth hereinabove.

A computer system/server 12 is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

The computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 4:
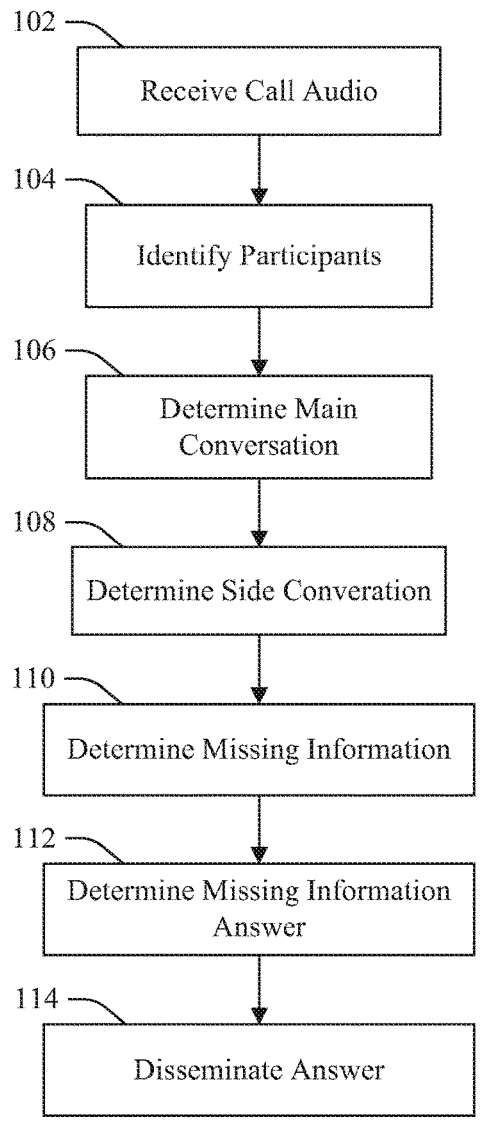
FIG. 4 is a flow chart illustration of an embodiment of the present invention.

FIG. 4 illustrates a process or system according to the present invention for analyzing conference call audio. At 102, a processor that is configured according to an aspect of the present invention (the "configured processor") receives conference call audio. The conference call audio may be obtained from a number of lines connected to the conference call. In one instance, the audio may be obtained from a single line designated as a main line for the conference call, a subset of lines on the conference call, or all the lines on the conference call. In another instance, the audio may be obtained from a muted line. For example, a team located in one location may call into a conference call. During the call their line may be muted, however the team may have a discussion amongst themselves. The configured processor may receive this audio as conference call audio.

At 104, the configured processor identifies participants or members on the conference call. In one instance, the identities are provided by a designated leader. In another instance, the identities are determined by the location of the call and a predetermined group. For example, if the call is from Cleveland, Ohio and includes a human resources department, then the configured processor determines the identities which include the members of the Cleveland human resources department. In another instance, the configured processor identifies the participants or members on the conference call using voice recognition software. For example, the configured processor may identify who is speaking on the call based on the sound of their voice.

At 106, the configured processor determines or defines a main conversation of the conference call. In one instance, the configured processor determines the main conversation as a function of identifying a connected line that includes the leader. For example, if the leader is on connected line one, then the configured processor determines that audio from connected line one is the main conversation. In another instance, the configured processor determines the main conversation as a function of a subset of predetermined connected lines. For example, if the conference call includes audio from three connected lines, but only two of which were predetermined as main conversation lines, then the configured processor determines audio from those two lines defines the main conversation, excluding conversation on the remaining, other line. In yet another instance, the configured processor determines the main conversation includes audio from all of the connected lines.

At 108, the configured processor determines or defines one or more side conversation of the conference call. In one instance the configured processor determines the side conversation as a function of a connected line that includes the leader. For example, if a leader is on connected line one, then the configured processor determines the side conversation as audio from all other connected lines. In another instance, the configured processor determines the side conversation as a function of a subset of predetermined connected lines. For example, if the conference call includes audio from three connected lines, but only two of which were predetermined as main conversation lines, then the configured processor determines audio from a non-main conversation line as the side conversation. In yet another instance, the configured processor determines the side conversation as a function of the main conversation volume. For example, if the main conversation occurs at a first volume and the conference call includes audio at a second different volume, then the configured processor determines the audio at the second different volume as the side conversation.

At 110, the configured processor determines or identifies one or more pieces of missing information as a function of identifying a question asked within audio content of the conference call. For example, if the leader asks "When is the project deadline?" during the main conversation, then the configured processor determines that the time and/or date of the project deadline is a piece of missing information. In another example, if someone asks "What are the names of the new hires?" in a side conversation, then the configured processor determines that the names of the new hires is a piece of missing information. In yet another example, if someone on the call asks "When does SVT start?" then the configured processor determines that the start time of SVT is a piece of missing information. In another instance, the configured processor further identifies who asked the question using voice recognition software. For example, if Bob asks a question, the configured processor may identify Bob as asking the question as a function of the sound of his voice.

At 112, the configured processor determines an answer corresponding to the question defining or identifying the determined piece of missing information. In one instance, the configured processor determines the answer by searching a document previously provided by the leader for the answer. For example, if the missing information is defined by a question to identify a project deadline, and a document with the project deadline was previously provided, then the configured processor determines the project deadline date within the document is the answer to the piece of missing information identified as "project deadline." In yet another example if the missing information is defined by a question to identify the SVT start, and a document with the SVT start has been provided by the leader, then the configured processor determines the SVT start within the document is the answer.

In another instance at 112, the configured processor analyzes the main conversation audio and side conversation audio to determine the answer to the missing information. For example, if the piece of missing information of a main conversation includes a project quota and a side conversation includes information regarding the project quota, then the configured processor determines the project quota discussed in the side conversation is the answer to the piece of missing information. In another example, if the piece of missing information of a side conversation includes a project deadline and a main conversation includes information regarding the project deadline, then the configured processor determines the project deadline discussed in the main conversation is the answer to the piece of missing information.

At 114, the configured processor disseminates the answer corresponding to the missing information. In one instance, the configured processor disseminates the answer to the missing information via a real-time notification to everyone or a subset of members on the call and/or members that have left the call. For example, the configured processor may email, text, and/or instant message addresses associated with the determined identities of the members on the call. In another instance, the configured processor provides audio corresponding to the answer to the missing information to those on the call. In another instance, the configured processor disseminates the answer to a conference call participant that asked the question. For example, if the configured processor previously determined Bob asked a question, the configured processor may disseminate the answer to that question directly to Bob.

Figure 5:
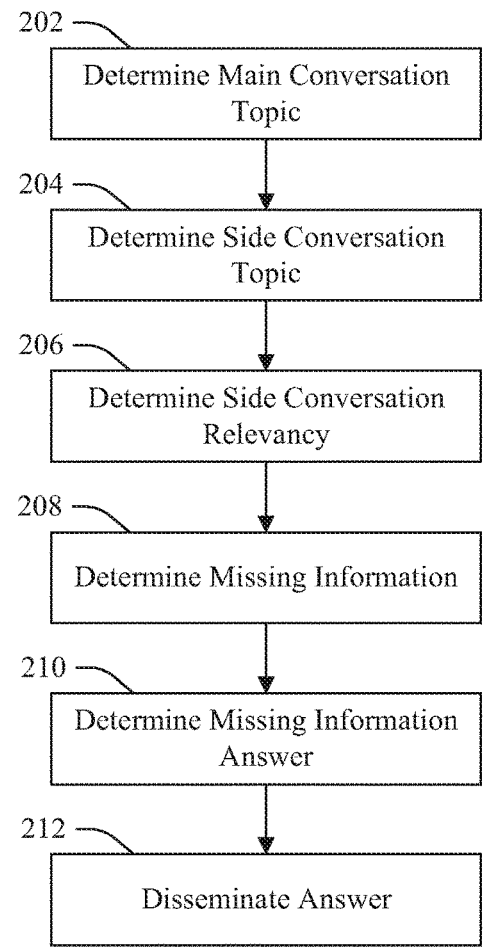
FIG. 5 is another flow chart illustration of an embodiment of the present invention.

FIG. 5 illustrates another process or system according to the present invention for analyzing conference call audio.

At 202, the configured processor determines or identifies one or more main conversation topics. In one instance, the configured processor determines a main conversation topic by searching a document provided by the leader for potential topics. For example, if the document provided by the leader includes information associated with project quotas, then the configured processor identifies a main conversation topic as "project quotas." In another instance, the configured processor determines a main conversation topic by analyzing audio content of a main conversation. For example, if a main conversation is discussing a new hire, then the configured processor determines a conversation topic as "new hires." In another example, if multiple people within the main conversation are discussing a project deadline, then the configured processor identifies the main conversation topic as "project deadline." In another instance, the configured processor determines a main conversation topic as a function of a user designation input. For example, a user may input affirmative designations or identifications of main conversation topics that include "new hires" and "project deadlines."

At 204, the configured processor determines one or more side conversation topics by analyzing side conversation audio. For example, if the side conversation includes information about a new hire, then the configured processor determines the side conversation as "new hires." In another example, if multiple people are discussing a project deadline within the side conversation, then the configured processor determines the side conversation topic as "project deadline."

At 206, the configured processor determines a relevancy of the side conversation(s) to the main conversation. In one instance, the configured processor determines a relevancy of the side conversation topic(s) to the main conversation as a function of a level or amount that the main conversation is related to or includes or comprehends the side conversation topic(s). For example, if a side conversation topic is lunch orders, and a main conversation topic is new hires, then the configured processor determines the side conversation topic is irrelevant as there is no apparent relation between lunch orders and new hires, one that meets a threshold level of relationship (for example, sharing a minimum percentage of text characters or words, sharing a common time of occurrence or duration, sharing a common subject or participant identity, etc.), and/or the main conversation topic of new hires is not inclusive of "lunch order" topic. In another instance, configured processor determines a relevancy of the side conversation(s) as a function of finding a relation or an association between the main conversation topic(s) and the side conversation topics(s). For example, if both of a main conversation topic and a side conversation topic include "project deadline" then the configured processor determines that the side conversation is relevant as there is a direct relation between the main and side conversation topic.

At 208, the configured processor determines or identifies one or more piece of missing information as a function of identifying a question asked within audio content of the conference call as previously described herein.

At 210, the configured processor analyzes main conversation audio and/or relevant side conversation audio to determine the answer to the missing information. For example, if the piece of missing information of a main conversation includes a project quota and a relevant side conversation includes information regarding the project quota, then the configured processor determines the project quota discussed in the side conversation is the answer to the piece of missing information. In another example, if the piece of missing information of a side conversation includes a project deadline and a related main conversation topic includes information regarding the project deadline, then the configured processor determines the project deadline discussed in the main conversation is the answer to the piece of missing information.

At 212, the configured processor disseminates the answer corresponding to the missing information.

Figure 6:
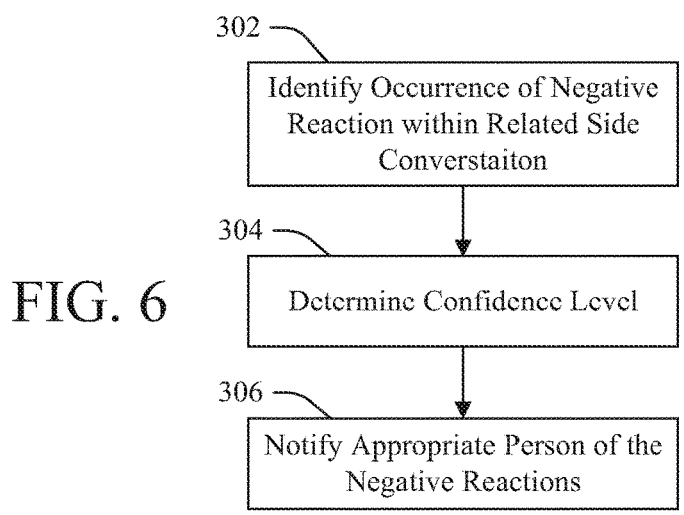
FIG. 6 is another flow chart illustration of an embodiment of the present invention.

FIG. 6 illustrates yet another process or system according to the present invention for analyzing conference call audio.

At 302, the configured processor determines or identifies occurrences of negative reactions within a relevant side conversation that are related to or associated with an attribute of the main conversation topic as a function of contemporaneous times of occurrence. In one instance, the negative reactions may be audible. For example, if the main conversation is a project that includes a project deadline date attribute, and a member on the conference call in a relevant side conversation contemporaneously (for example, immediately, within two seconds, or prior to any other audible utterance after the recitation of the project deadline date, etc.) laughs, says "no way," or otherwise expresses audio or text content identified as negative feedback content to the value expressed for the "project deadline", then the configured processor determines the occurrence of a negative reaction relative to the project deadline date. Aspects may also increment counters for each negative reaction; for example, if the member laughs three different times at the deadline date, then the configured processor determines three different negative reactions occurred with regard to the project deadline. In another instance, the negative reaction may be determined using biometric feedback software. The biometric feedback includes but is not limited to redness in the face or a facial expression associated with a negative reaction. For example, a camera in the room may record the conference call. Using biometric feedback software, the configured processor may analyze the recorded video to determine a number of times a negative reaction occurs as a function of the biometric feedback.

At 304, the configured processor determines a confidence level in the attribute of the main conversation topic as a function of the determined negative reaction(s). Thus, in response to determining that a total number of the negative reactions exceeds a predetermined threshold, the configured processor may flag the value expressed in the main conversation for the attribute for review and reassessment. For example, if the predetermined threshold is three and there were four negative reactions for a given main conversation topic, then the configured processor determines the number of negative reactions exceeded the predetermined threshold. In another example, if the predetermined threshold is fifty percent, and there is a negative reaction seventy five percent of the time, a main conversation topic is discussed, then the configured processor determines the number of negative reactions exceeded the predetermined threshold and flags the attribute value for review. The threshold value may also be based on identity of utterer of the negative reaction: for example, a single negative reaction from a manager, or person identified as directly responsible for setting the attribute value, may have a higher weight that a negative reaction from another person, for purposes of meeting a threshold.

At 306, the configured processor notifies an appropriate person (a leader of the conversation, a manager or supervisor of the projects, a person responsible for determining or setting the attribute value, etc.) that the attribute value has been flagged for review in response to the negative reactions meeting a threshold condition (for example, as a function of a number of negative reactions exceeding the predetermined threshold, or that a manager has generated a negative reaction, etc.). In one embodiment, in response to determining that a negative reaction exceeds a predetermined threshold, the configured processor iteratively and contemporaneously notifies a conference leader at 306 of the negative reaction(s) and the corresponding topic attribute value during the conference or otherwise prior to termination of a time period reserved for the conference, thereby giving the leader an opportunity to dynamically address the topic and attribute, including by dynamically revising the attribute value triggering negative responses until the negative responses determined at 302 fall below an applicable negative response threshold at 304, during the conversation. Thus, embodiments of the present invention enable dynamic correction of main topic conversation attribute values, in real-time, in response to negative value data within side-conversations, enhancing business value of the time and resources expended in conducting the conference, and reducing time and expense costs required to later correct the attribute value relative to prior art methods that rely upon post-conference correction of the attribute value.

Aspects of the present invention improve communications in a conference call so that known information is not lost and is properly shared with others in the call. While a call leader may directly address agenda topics with a select number of individuals on the call in a main conversation, others on the call may carry out their own side conversation about the agenda topics. These side conversations may not be carried out in the same volume as the main conversation or may occur on a muted line. As a result, those on the call may miss information discussed in the main conversation as well as the side conversations Aspects correlate the content of side conversations, commentary and written documentation to main conference content, and thereby autonomously and automatically determine or identify answers to questions asked within the main conversation that remain otherwise unanswered within the main conversations. Information that might have been lost to many on the call is sent automatically to a leader of the call or to others as well. There is a lot of information that is lost in any call. Very valuable snippets of information which may be classified to a specific topic may be spoken in side conversations in a conference room or in a side conversation on different phone lines. This system aims to make use of this information so that important information is no longer lost.

The system may employ microphones and cameras for picking up on what is being said by each user. The microphones may be a simple speaker phone in an office and phone headset, etc. It may or may not be paired to a user, but it will be capable of picking up the spoken word and in some cases visual reactions. Audio analysis can separate all the sounds and can make correlation to specific phones or people. Speech to text is used to translate the spoken words into simple text form for storing in a knowledge base to be used by the real time processing unit. Natural Langue Processing (NLP) is used in some embodiments to categorize spoken phrases such that it can relate back to real-time conversation quickly. Central knowledge databases may be used to track people on the line and which phone line they are on. People can be discovered through voice recognition, through previous line to person pairings, or through a personal announcement as to who joined, as well as the content of what is said during the call in relation to various topics of interest. A communication mechanism is used for the system to ping real-time information to the owners or interested parties. A documentation reader is used in some embodiments as the primary host may set up documentation as input to the conference call which may be read and processed in real time in order to possibly answer an open question. For example, an excel spreadsheet "&Key dates.xls8" may be configured as input to a meeting. If a question comes up on the date when SVT level testing would begin, the system may find the date associated with the SVT column within the spreadsheet and respond to the configured owners of the meeting so that they can share the information (without opening the document themselves).

A network of phones is used in some embodiments as it may be prudent to make use of individual's phones for the purpose. If so configured, a specific user's phone may be used in addition to the open conference lines in order to more easily pick up content. For example, for a particular meeting, a participant's phone may be wired to the central system to help pick up a side conversation and clues.

In one embodiment, a robot may move about a conference room to listen in on conversations. A small bot may move around a conference table. A large bot could move around the room on the floor. The robot may be trained to be drawn to the spoken word. So when Nancy starts talking to Bill at one end, the bot hears that and moves towards them and the determination could be made as to the nature of the discussion between Nancy and Bill. In one embodiment, the determination may be made at the central server level and communication is sent back to the robot to indicate whether or not it is important. In another embodiment, the robot may autonomously determine importance, via cognitive capabilities of the robot or associated processing. Either way, determination is made as to the relevance of the side chatter and the robot may move on from the people or continue to listen in. Multiple bots could all work together, with the end result being the more important side chatter is identified, focused on and picked up (via moving within optimal microphone range of the persons engaged in the important side chatter) and transcribed and stored in the central system. Another method may allow for multiple bots having divergent tasks or targets for locations within microphone range, where one is in charge of obtaining and understanding the side conversations, and another bot is in charge of obtaining and understanding questions from the crowd and looking for answers in the included documents or from previously transcribed notes from earlier in the meeting.

The device or devices used for implementation may involve cognitive capability in a central system. It may also include user's cell phones, computers or other devices that may also be trained to listen in and (1) send conversations forward to the central system or (2) provide cognitive capability.

The terminology used herein is for describing particular aspects only and is not intended to be limiting of the invention. As used herein, the singular forms "a", "an" and "the" are intended to include the plural forms as well, unless the context clearly indicates otherwise. It will be further understood that the terms "include" and "including" when used in this specification specify the presence of stated features, integers, steps, operations, elements, and/or components, but do not preclude the presence or addition of one or more other features, integers, steps, operations, elements, components, and/or groups thereof. Certain examples and elements described in the present specification, including in the claims, and as illustrated in the figures, may be distinguished, or otherwise identified from others by unique adjectives (e.g. a "first" element distinguished from another "second" or "third" of a plurality of elements, a "primary" distinguished from a "secondary" one or "another" item, etc.) Such identifying adjectives are generally used to reduce confusion or uncertainty, and are not to be construed to limit the claims to any specific illustrated element or embodiment, or to imply any precedence, ordering or ranking of any claim elements, limitations, or process steps.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for analyzing conference call audio, comprising executing on a computer processor:
   determining a main conversation of a conference call to comprise first portions of audio content of the conference call that are obtained from a first connected line that includes a leader of the conference call, wherein the conference call audio content comprises audio content obtained from a plurality of connected lines inclusive of the first connected line;
   distinguishing a side conversation within the conference call from the main conversation as second portions of audio content that are obtained from a second connected line of the plurality of connected lines, wherein the second connected line is different from the first connected line;
   determining via speech-to-text processing of the first portions of the audio content a question asked within text content obtained from the main conversation first portions of the audio content; and
   in response to determining via speech-to-text processing of the second portions of the audio content that text content of the side conversation comprises text content of the question, identifying an occurrence of an answer to the question within the side conversation.

2. The method of claim 1, further comprising:
   integrating computer-readable program code into a computer system comprising a processor, a computer readable memory in circuit communication with the processor, and a computer readable storage medium in circuit communication with the processor; and
   wherein the processor executes program code instructions stored on the computer-readable storage medium via the computer readable memory and thereby performs the determining the main conversation of the conference call, distinguishing the side conversation within the conference call from the main conversation, determining the question asked within the main conversation, and identifying the occurrence of the answer to the question within the side conversation.

3. The method of claim 2, wherein the computer-readable program code is provided as a service in a cloud environment.

4. The method of claim 1, further comprising:
disseminating the answer to members on the conference call in real time by emailing the members.

5. The method of claim 1, wherein the distinguishing the side conversation within the conference call from the main conversation comprises:
determining a first audio level for the main conversation; and
determining that a second audio level of the side conversation is different from the first audio level.

6. The method of claim 1, further comprising:
determining a main conversation topic of the main conversation;
determining a side conversation topic of the side conversation;
determining a relevancy value of the side conversation topic to the main conversation topic as a function of a strength of relation between the main conversation topic and the side conversation topic; and
identifying the occurrence of the answer within the side conversation in response to the determined relevancy value of the side conversation topic to the main conversation topic meeting a threshold relevancy value.

7. The method of claim 6, further comprising:
determining the main conversation topic by searching a document that is provided by a leader.

8. The method of claim 6, further comprising:
identifying a negative reaction to an attribute of the main conversation topic that occurs within the side conversation; and
flagging a value of the attribute of the main conversation topic for review in response to determining that the negative reaction meets a threshold condition.

9. A system comprising:
a processor;
a computer readable memory in circuit communication with the processor; and
a computer readable storage medium in circuit communication with the processor;
wherein the processor executes program instructions stored on the computer-readable storage medium via the computer readable memory and thereby:
determines a main conversation of a conference call to comprise first portions of audio content of the conference call that are obtained from a first connected line that includes a leader of the conference call, wherein the conference call audio content comprises audio content obtained from a plurality of connected lines inclusive of the first connected line;
distinguishes a side conversation within the conference call from the main conversation as second portions of audio content that are obtained from a second connected line of the plurality of connected lines, wherein the second connected line is different from the first connected line;
determines via speech-to-text processing of the first portions of the audio content a question asked within text content obtained from the main conversation first portions of the audio content; and
in response to determining via speech-to-text processing of the second portions of the audio content that text content of the side conversation comprises text content of the question, identifies an occurrence of an answer to the question within the side conversation.

10. The system of claim 9, wherein the processor executes the program instructions stored on the computer-readable storage medium via the computer readable memory and thereby:
disseminates the answer to members on the conference call in real time by emailing the members.

11. The system of claim 9, wherein the processor executes the program instructions stored on the computer-readable storage medium via the computer readable memory and thereby:
distinguishes the side conversation within the conference call from the main conversation by:
determining a first audio level for the main conversation; and
determining that a second audio level of the side conversation is different from the first audio level.

12. The system of claim 9, wherein the processor executes the program instructions stored on the computer-readable storage medium via the computer readable memory and thereby:
determines a main conversation topic of the main conversation;
determines a side conversation topic of the side conversation;
determines a relevancy value of the side conversation topic to the main conversation topic as a function of a strength of relation between the main conversation topic and the side conversation topic; and
identifies the occurrence of the answer within the side conversation in response to the determined relevancy value of the side conversation topic to the main conversation topic meeting a threshold relevancy value.

13. The system of claim 12, wherein the processor executes the program instructions stored on the computer-readable storage medium via the computer readable memory and thereby:
determines the main conversation topic by searching a document that is provided by a leader.

14. The system of claim 12, wherein the processor executes the program instructions stored on the computer-readable storage medium via the computer readable memory and thereby:
identifies a negative reaction to an attribute of the main conversation topic that occurs within the side conversation; and
flags a value of the attribute of the main conversation topic for review in response to determining that the negative reaction meets a threshold condition.

15. A computer program product for analyzing conference call audio, the computer program product comprising:
a computer readable storage medium having computer readable program code embodied therewith, wherein the computer readable storage medium is not a transitory signal per se, the computer readable program code comprising instructions for execution by a processor that cause the processor to:
determine a main conversation of a conference call to comprise first portions of audio content of the conference call that are obtained from a first connected line that includes a leader of the conference call, wherein the conference call audio content comprises audio content obtained from a plurality of connected lines inclusive of the first connected line;
distinguish a side conversation within the conference call from the main conversation as second portions of audio content that are obtained from a second connected line of the plurality of connected lines, wherein the second connected line is different from the first connected line;

determine via speech-to-text processing of the first portions of the audio content a question asked within text content obtained from the main conversation first portions of the audio content; and in response to determining via speech-to-text processing of the second portions of the audio content that text content of the side conversation comprises text content of the question, identify an occurrence of an answer to the question within the side conversation.

16. The computer program product of claim 15, wherein the computer readable program code instructions for execution by the processor further cause the processor to:

disseminate the answer to members on the conference call in real time by emailing the members.

17. The computer program product of claim 15, wherein the computer readable program code instructions for execution by the processor further cause the processor to:

determine a main conversation topic of the main conversation;

determine a side conversation topic of the side conversation;

determine a relevancy value of the side conversation topic to the main conversation topic as a function of a strength of relation between the main conversation topic and the side conversation topic; and identify the occurrence of the answer within the side conversation in response to the determined relevancy value of the side conversation topic to the main conversation topic meeting a threshold relevancy value.

18. The computer program product of claim 15, wherein the computer readable program code instructions for execution by the processor further cause the processor to:

identify a negative reaction to an attribute of the main conversation topic that occurs within the side conversation; and flag a value of the attribute of the main conversation topic for review in response to determining that the negative reaction meets a threshold condition.

* * * * *